(12) United States Patent
Struziak et al.

(10) Patent No.: US 7,648,280 B2
(45) Date of Patent: Jan. 19, 2010

(54) WEIGHT REDUCTION FOR JOURNAL AIR BEARING

(75) Inventors: Ronald M. Struziak, Longmeadow, MA (US); Christopher McAuliffe, Windsor, CT (US); Jeffery L. Stark, Niantic, CT (US)

(73) Assignee: Hamilton Sundstrand Corporation, Rockford, IL (US)

( * ) Notice: Subject to any disclaimer, the term of this patent is extended or adjusted under 35 U.S.C. 154(b) by 508 days.

(21) Appl. No.: 11/786,796

(22) Filed: Apr. 12, 2007

(65) Prior Publication Data

US 2008/0253705 A1    Oct. 16, 2008

(51) Int. Cl.
*F16C 32/06* (2006.01)
(52) U.S. Cl. ........................ 384/106; 384/103
(58) Field of Classification Search ......... 384/103–106, 384/99, 215, 220, 222
See application file for complete search history.

(56) References Cited

U.S. PATENT DOCUMENTS 4,552,466 A    11/1985    Warren
5,209,577 A *  5/1993    Swatek .................. 384/97
5,427,455 A    6/1995    Bosley
5,536,087 A    7/1996    Rao et al.
5,658,079 A    8/1997    Struziak et al.
5,921,683 A    7/1999    Merritt et al.
7,056,025 B2 * 6/2006    Nakata .................. 384/103

FOREIGN PATENT DOCUMENTS

EP         1566556 A2    8/2005
WO      WO99/14510 A1    3/1999

OTHER PUBLICATIONS

Official Extended Search Report of the European Patent Office in counterpart foreign Application No. 08250619.7 filed Feb. 22, 2008.

\* cited by examiner

*Primary Examiner*—Thomas R Hannon
(74) *Attorney, Agent, or Firm*—Kinney & Lange, P.A.

(57) ABSTRACT

A hydrodynamic fluid film journal bearing system includes a journal sleeve and one or more hydrodynamic fluid film foils positioned at least partially within the journal sleeve. The journal sleeve defines an inner diameter surface, an outer diameter surface, a wall thickness between the inner and outer diameter surfaces, and opposite first and second ends. The wall thickness of the journal sleeve is reduced at a first region located between the first and second ends, and a chamfered region is formed on the outer diameter surface of the journal sleeve between the first o-ring land and the first end of the journal sleeve.

19 Claims, 2 Drawing Sheets

WEIGHT REDUCTION FOR JOURNAL AIR BEARING

BACKGROUND

The present invention relates to hydrodynamic fluid film bearing systems.

Hydrodynamic fluid film journal bearings, also called journal air bearings or foil bearings, can be used to provide support to rotatable components such as shafts. A typical prior art bearing assembly of this type (e.g., as disclosed by U.S. Pat. No. 5,658,079), includes a journal sleeve, a bump foil, an intermediate foil, and a top foil. The bump foil, the intermediate foil and the top foil are wrapped inside the journal sleeve in a substantially cylindrical shape, and those foils are positioned between the journal sleeve and the rotatable component. Each foil has an end that is engaged to the journal sleeve, and can have another end that is free (i.e., not engaged to the journal sleeve). During operation, rotation of the rotatable component causes a working fluid to form a cushion (often referred to as an "air bearing") that supports the rotatable component with little or no direct contact between the rotatable component and the foils of the bearing.

Conventional hydrodynamic fluid film journal bearings have a substantially cylindrical journal sleeve. These cylindrical journal sleeves have walls of uniform thickness defined between an outer diameter surface and an opposite inner diameter surface. Those journal sleeve walls are relatively thick for providing stiffness. However, such thick journal sleeve walls add considerable weight to the bearing. Weight of bearings is an important design consideration, particularly for aerospace applications.

SUMMARY

A hydrodynamic fluid film journal bearing system includes a journal sleeve and one or more hydrodynamic fluid film foils positioned at least partially within the journal sleeve. The journal sleeve defines an inner diameter surface, an outer diameter surface, a wall thickness between the inner and outer diameter surfaces, and opposite first and second ends. The wall thickness of the journal sleeve is reduced at a first region located between the first and second ends, and a chamfered region is formed on the outer diameter surface of the journal sleeve between the first o-ring land and the first end of the journal sleeve.

DETAILED DESCRIPTION

The present invention provides weight reduction for a hydrodynamic fluid film journal bearing system by providing a tailored journal sleeve profile that reduces a wall thickness of at least a portion of a journal sleeve of the bearing system. Furthermore, a journal sleeve according to the present invention includes one or more chamfered regions that help reduce a risk of damage to O-rings during assembly and installation of the bearing system.

Figure 1:
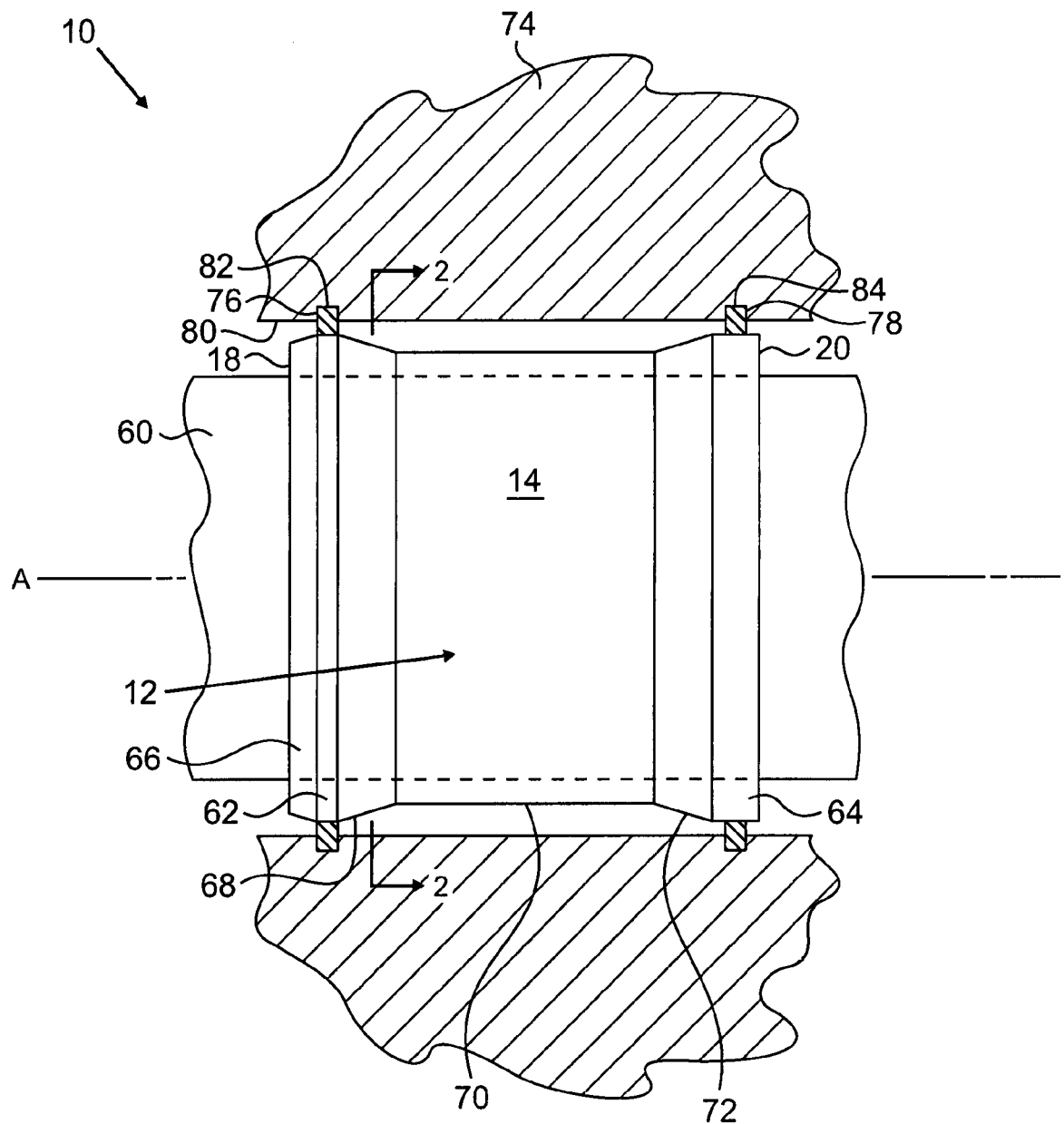
FIG. 1 is a partial cross-sectional side view of a hydrodynamic fluid film journal bearing system according to the present invention.
Figure 2:
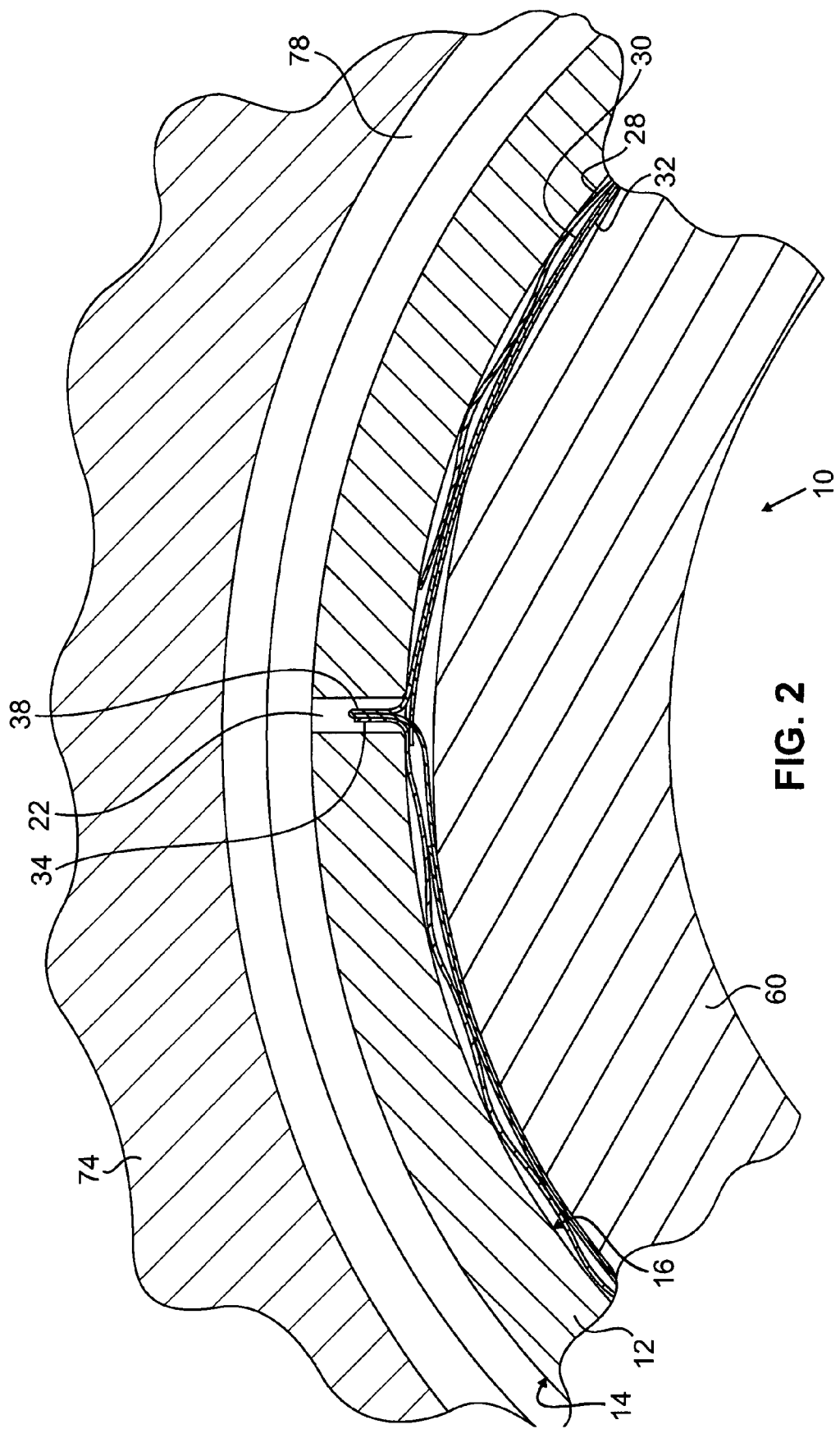
FIG. 2 is a cross-sectional view of the hydrodynamic fluid film journal bearing system, taken along line 2-2 of FIG. 1.

FIG. 1 is a partial cross-sectional side view of a hydrodynamic fluid film journal bearing system 10. FIG. 2 is a cross-sectional view of the hydrodynamic fluid film journal bearing system 10, taken along line 2-2 of FIG. 1. In general, the bearing system 10 includes a journal sleeve 12 formed as a unitary body that defines an outer surface 14, an inner surface 16, a first end 18, and a second end 20. The journal sleeve 12 is arranged about a central axis A. A key slot 22 (or keyway) is formed in the journal sleeve 12, and the key slot 22 extends entirely through a sleeve wall defined between the outer and inner surfaces 14 and 16 of the journal sleeve 12. A number of foils are arranged inside the journal sleeve 12.

As shown in FIG. 2, those foils include a bump foil 28, an intermediate foil 30 and a top foil 32. The bump foil 28, the intermediate foil 30 and the top foil 32 are each thin sheets of material (e.g., nickel-based alloys or steel) wrapped (or rolled) in a generally cylindrical shape and positioned in a bore of the journal sleeve 12 defined by the substantially cylindrical inner surface 16. The bump foil 28 is corrugated, allowing a working fluid or cooling fluid to flow through spaces formed between adjacent corrugations. The bump foil 28 is positioned adjacent to the inner surface 16 of the journal sleeve 12, and has a bent end 34 that extends radially outward at least partially into the key slot 22 in order to engage the key slot 22 and retain the bump foil 30 relative to the journal sleeve 12. The intermediate foil 30 is positioned adjacent to and radially inward from the bump foil 28, and the top foil is positioned adjacent to and radially inward from the intermediate foil 30. The intermediate foil 30 and the top foil 32 are joined together at a bent region 38 that extends radially outward at least partially into the key slot 22, in order to engage the key slot 22 and retain both the intermediate and top foils 30 and 32 relative to the journal sleeve 12. It should be noted that the key slot 22 and the foils 28, 30 and 32 of the system 10 can be configured in the manner disclosed by commonly-assigned U.S. patent application Ser. No. 11/786,637, entitled "Improved Journal Air Bearing," filed on even date herewith, which is hereby incorporated by reference in its entirety.

A rotatable component like a shaft 60 is positioned inside the journal sleeve 12 and the foils 28, 30 and 32. During operation, the shaft 60 would rotate into a free end of the top foil 32 tending to open the wound foils (i.e., clockwise with respect to the cross-section of the bearing system 10 shown in FIG. 2). Rotation of the shaft 60 would cause a working fluid to form a cushion (often referred to as an "air bearing") that supports the shaft 60 while rotating at operating speed with little or no direct contact between the shaft 60 and the top foil 32 of the bearing system 10. However, contact between the shaft 60 and the top foil 32 may still occur at relatively low speed operation, such as during startup and shutdown phases, and due to incidental contact during regular operation.

The journal sleeve 12 includes a first O-ring land 62 and a second O-ring land 64, a chamfered region 66, and a grooved region defined at the outer surface 14 by a first tapered portion 68, a middle recessed portion 70, and a second tapered portion 72. The first O-ring land 62 is located adjacent to the first end 18 of the journal sleeve 12, and the second O-ring land 64 is located adjacent to the second end 20 of the journal sleeve 12. The chamfered region 66 is located between the first O-ring land 62 and the first end 18 of the journal sleeve, and the second O-ring land 64 is located immediately adjacent to the second end 20 of the journal sleeve 12 in the illustrated embodiment. The first and second O-ring lands 62 and 64 each define a substantially cylindrical region of the outer surface 14 of the journal sleeve 12 that is parallel to the axis A.

The grooved region defined by the first tapered portion 68, the middle recessed portion 70 and the second tapered portion 72 is located between the first and second O-ring lands 62 and 64. The middle recessed portion 70 forms a generally cylindrical region of the outer surface 14 of the journal sleeve 12, and the first and second tapered portions 68 and 72 form generally frusto-conical regions of the outer surface 14 that connect the middle recessed portion 70 with the first and second O-ring lands 62 and 64, respectively. Furthermore, the middle recessed portion 70 has a smaller outer diameter than the first and second O-ring lands 62 and 64, which reduces a thickness of the sleeve wall defined between the outer and inner surfaces 14 and 16 of the journal sleeve 12 within the grooved region. The reduced thickness of the sleeve wall within the grooved region at the outer surface 14 of the journal sleeve 12 provides weight reduction for the bearing system 10. It will be understood by those of ordinary skill in the art that the dimensions of the features of the journal sleeve 12, and in particular thicknesses of the sleeve wall, will vary as desired for particular applications. Moreover, angles of the first and second tapered portions 68 and 72 can vary as a function of the differences in wall thicknesses between the middle recessed portion 70 and the first and second O-ring lands 62 and 64, although those angles will generally be greater than 0° and less than 90° with respect to the axis A. The weight reduction features defined at the outer surface 14 of the journal sleeve 12 need not have any impact on design of the inner surface 16 of the journal sleeve, which can maintain a substantially cylindrical shape.

The chamfered region 66 is located immediately adjacent to the first end 18 of the journal sleeve 12, between the first end 18 of the journal sleeve 12 and the first O-ring land 62. The chamfered region 66 is generally frusto-conical in shape and causes the outer surface 14 of the journal sleeve 12 to angle from a greater outer diameter at the first O-ring land 62 to a smaller outer diameter at the first end 18. The angle of the chamfered region 66 relative to the axis A can vary as desired for particular applications. As explained further below, the angle defined by the chamfered region 66 helps reduce a risk of damage to O-rings during assembly of the bearing system 10.

The journal sleeve 12 can be made of a metallic material and shaped using known techniques such as milling, turning and grinding.

The bearing system 10 further includes a housing 74, a first O-ring 76 and a second O-ring 78. It should be noted that in FIG. 1, the housing 74 and the first and second O-rings 76 and 78 are shown in cross-section in order to reveal the journal sleeve 12 and a portion of the shaft 60 not shown in cross-section. The housing 74 generally defines a bore 80 in which the journal sleeve 12 is positioned. In the illustrated embodiment, the first and second O-rings 76 and 78 are engaged with the housing 74 in respective first and second engagement grooves 82 and 84. The first O-ring 76 rests against and engages the first O-ring land 62 of the journal sleeve 12, and the second O-ring 78 rests against and engages the second O-ring land 64 of the journal sleeve 12. The first and second O-rings 76 and 78 can be of a conventional type known for use with hydrodynamic fluid film journal bearing systems.

The hydrodynamic fluid film journal bearing system 10 of the present invention can be assembled as follows. The foils 28, 30 and 32 are assembled inside the journal sleeve 12, and the first and second O-rings 76 and 78 are positioned in the engagement grooves 82 and 84, respectively, in the housing 74. The journal sleeve 12 (with the foils 28, 30 and 32 assembled therein) is then inserted into the bore 80 of the housing 74, inside the first and second O-rings 76 and 78. The first end 18 of the journal sleeve 12 can be inserted into the bore 80 first, such that the chamfered region 66 passes the second O-ring 78 followed by the first O-ring 76. By inserting the journal sleeve 12 in that manner, the chamfered region 66 as well as the first and second tapered portions 68 and 72 help reduce a risk of damage to the first and second O-rings 76 and 78 during assembly by providing relatively smooth transitions between the first and second O-ring lands 62 and 64 and adjacent outer surfaces regions of the journal sleeve 12 that have smaller outer diameters. The first and second O-rings 76 and 78 are susceptible to cutting and tearing during assembly when the journal sleeve 12 is inserted, and the present invention help reduce the risk of such damage occurring.

In addition, by having the chamfered region 66 located immediately adjacent to the first end 18 of the journal sleeve 12 but, in contrast, having the second O-ring land 64 located immediately adjacent to the second end 20 of the journal sleeve (i.e., not having another chamfered region immediately adjacent to the second end 20), the first and second ends 18 and 20 of the journal sleeve 12 can be readily distinguished. This is important because the hydrodynamic fluid film journal bearing system 10 is configured such that the shaft 60 should rotate in a particular direction relative to the foils 28, 30 and 32, and improper assembly due to insertion of the wrong end of the journal sleeve into the bore 80 of the housing 74 can disrupt that preferred rotational relationship. Therefore, the chamfered region 66 provides assembly foolproofing functionality to help ensure proper assembly of the bearing system 10.

Although the present invention has been described with reference to preferred embodiments, workers skilled in the art will recognize that changes may be made in form and detail without departing from the spirit and scope of the invention.

What is claimed is:

1. A hydrodynamic fluid film journal bearing system comprising:
    a journal sleeve that defines an inner diameter surface, an outer diameter surface, a wall thickness between the inner and outer diameter surfaces, a first o-ring land, and opposite first and second ends, wherein the wall thickness is reduced at a first region located between the first and second ends, wherein the first o-ring land is formed at the outer diameter surface of the journal sleeve adjacent to the first end, and wherein a chamfered region is formed on the outer diameter surface of the journal sleeve between the first o-ring land and the first end of the journal sleeve; and
    one or more hydrodynamic fluid film foils positioned at least partially within the journal sleeve.

2. The system of claim 1, wherein the wall thickness of the journal sleeve is reduced by a groove formed at the outer diameter surface of the journal sleeve.

3. The system of claim 1 and further comprising:
    a second o-ring land formed at the outer diameter surface of the journal sleeve adjacent to the second end.

4. The system of claim 3, wherein the second o-ring land is formed at the outer diameter surface of the journal sleeve immediately adjacent to the second end for assembly foolproofing.

5. The system of claim 3, wherein the wall thickness of the journal sleeve is reduced by a groove formed between the first and second o-ring lands at the outer diameter surface of the journal sleeve, the groove comprising:
    a middle portion;
    a first tapered portion located between the middle portion and the first o-ring land; and
    a second tapered portion located between the middle portion and the second o-ring land.

6. The system of claim 5, wherein the middle portion of the groove is substantially cylindrically shaped.

7. The system of claim 3 and further comprising:
a housing having first and second o-ring engagement grooves;
a first o-ring engaged between the first o-ring engagement groove in the housing and the first o-ring land of the journal sleeve; and
a second o-ring engaged between the second o-ring engagement groove in the housing and the second o-ring land of the journal sleeve.

8. A hydrodynamic fluid film journal bearing system comprising:
a rotatable shaft;
a journal sleeve positioned about the shaft, the journal sleeve defining an inner diameter surface, an outer diameter surface, a wall thickness between the inner and outer diameter surfaces, and opposite first and second ends;
one or more hydrodynamic fluid film foils disposed between the journal sleeve and the shaft;
a first o-ring land formed at the outer diameter surface of the journal sleeve adjacent to the first end;
a second o-ring land formed at the outer diameter surface of the journal sleeve adjacent to the second end; and
a weight reduction groove formed at the outer diameter surface of the journal sleeve, wherein the weight reduction groove reduces the wall thickness of the journal sleeve at a first region located between the first and second o-ring lands, and wherein the weight reduction groove includes at least one tapered portion.

9. The system of claim 8 and further comprising:
a chamfered region formed on the outer diameter surface of the journal sleeve between the first o-ring land and the first end of the journal sleeve.

10. The system of claim 9, wherein the second o-ring land is formed at the outer diameter surface of the journal sleeve immediately adjacent to the second end.

11. The system of claim 8, wherein the weight reduction groove comprises:
a middle portion; and said at least one tapered portion comprises:
a first tapered portion located between the middle portion and the first o-ring land; and
a second tapered portion located between the middle portion and the second o-ring land.

12. The system of claim 11, wherein the middle portion of the weight reduction groove is substantially cylindrically shaped.

13. The system of claim 8 and further comprising:
a housing having first and second o-ring engagement grooves;
a first o-ring engaged between the first o-ring engagement groove in the housing and the first o-ring land of the journal sleeve; and
a second o-ring engaged between the second o-ring engagement groove in the housing and the second o-ring land of the journal sleeve.

14. A hydrodynamic fluid film journal bearing system comprising:
a journal sleeve formed as a unitary body positioned about the shaft, the journal sleeve defining an inner diameter surface, an outer diameter surface, a wall thickness between the inner and outer diameter surfaces, and opposite first and second ends;
one or more hydrodynamic fluid film foils positioned at least partially within the journal sleeve;
a first o-ring land formed at the outer diameter surface of the journal sleeve adjacent to the first end;
a second o-ring land formed at the outer diameter surface of the journal sleeve adjacent to the second end;
a housing having first and second o-ring engagement grooves;
a first o-ring engaged between the first o-ring engagement groove in the housing and the first o-ring land of the journal sleeve;
a second o-ring engaged between the second o-ring engagement groove in the housing and the second o-ring land of the journal sleeve; and
a chamfered region formed on the outer diameter surface of the journal sleeve between the first o-ring land and the first end of the journal sleeve for reducing a risk of damage to the first and second o-rings during assembly of the system.

15. The system of claim 14, wherein the second o-ring land is formed at the outer diameter surface of the journal sleeve immediately adjacent to the second end.

16. The system of claim 14 and further comprising:
a groove formed at the outer diameter surface of the journal sleeve.

17. The system of claim 16, wherein the groove reduces the wall thickness of the journal sleeve at a first region located between the first and second o-ring lands.

18. The system of claim 16, wherein the groove comprises:
a middle portion;
a first tapered portion located between the middle portion and the first o-ring land; and
a second tapered portion located between the middle portion and the second o-ring land.

19. The system of claim 18, wherein the middle portion of the groove is substantially cylindrically shaped.

* * * * *